(12) United States Patent
Roberson et al.

(10) Patent No.: US 10,677,048 B2
(45) Date of Patent: *Jun. 9, 2020

(54) DOWNHOLE FLUID DETECTION USING SURFACE WAVES

(71) Applicant: Halliburton Energy Services, Inc., Houston, TX (US)

(72) Inventors: Mark W. Roberson, Cary, NC (US); Paul F. Rodney, Spring, TX (US); Batakrishna Mandal, Missouri City, TX (US); Krishna M. Ravi, Kingwood, TX (US); Scott Goodwin, Chapel Hill, NC (US); Vimal V. Shah, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/537,715

(22) PCT Filed: Mar. 11, 2015

(86) PCT No.: PCT/US2015/019872
§ 371 (c)(1),
(2) Date: Jun. 19, 2017

(87) PCT Pub. No.: WO2016/144349
PCT Pub. Date: Sep. 15, 2016

(65) Prior Publication Data
US 2018/0003036 A1    Jan. 4, 2018

(51) Int. Cl.
*E21B 47/10* (2012.01)
*G01V 3/18* (2006.01)
*E21B 47/12* (2012.01)

(52) U.S. Cl.
CPC ............ *E21B 47/101* (2013.01); *E21B 47/10* (2013.01); *E21B 47/12* (2013.01); *E21B 47/122* (2013.01); *G01V 3/18* (2013.01)

(58) Field of Classification Search
CPC ...... E21B 47/101; E21B 47/122; E21B 47/10; E21B 47/12; E21B 47/14; E21B 47/16; G01V 3/18
See application file for complete search history.

(56) References Cited

U.S. PATENT DOCUMENTS 4,390,975 A    6/1983  Shawhan
4,475,591 A *  10/1984  Cooke, Jr. ............... E21B 33/14
                                                       166/254.1

(Continued)

FOREIGN PATENT DOCUMENTS

WO    2014100272    6/2014

OTHER PUBLICATIONS

Barlow et al., "Surface Waves", IEEE Radio Section, Paper No. 1482, Apr. 22, 1953, 13 pages.

(Continued)

*Primary Examiner* — Ian J Lobo
(74) *Attorney, Agent, or Firm* — Kilpatrick Townsend & Stockton LLP (57) ABSTRACT

A communication system that is positionable in a wellbore can include a first transceiver positioned externally to a casing string. The first transceiver can be operable to detect a presence or an absence of a surface wave; determine a location of a fluid in the wellbore based on the presence or the absence of the surface wave; and transmit data indicative of the location to a second transceiver. The surface wave can include an electromagnetic wave that has a magnetic field or an electric field that is non-transverse to a direction of propagation of the surface wave. The communication sys- (Continued)

tem can also include the second transceiver, which can be positioned externally the casing string and operable to receive the data.

20 Claims, 6 Drawing Sheets

(56) References Cited

U.S. PATENT DOCUMENTS

| | | | |
|---|---|---|---|
| 5,148,408 | A | 9/1992 | Matthews |
| 10,132,160 | B2 * | 11/2018 | Roberson ............... E21B 47/122 |
| 2006/0290529 | A1 | 12/2006 | Flanagan |
| 2008/0030365 | A1 | 2/2008 | Fripp et al. |
| 2010/0194586 | A1 | 8/2010 | Tjhang et al. |
| 2010/0223988 | A1 | 9/2010 | Crow et al. |
| 2014/0246237 | A1 | 9/2014 | Prammer |
| 2015/0034311 | A1 * | 2/2015 | Tunget ...................... E21B 7/20 166/250.14 |

OTHER PUBLICATIONS

International Patent Application No. PCT/US2015/019872, "International Search Report and Written Opinion", dated Oct. 12, 2015, 15 pages.

Sommerfeld, "Über die Fortpflanzung elektrodynamischer Wellen an längs eines Drahtes", Über die Fortpflanzung elektrodynamischer Wellen an längs eines Drahtes, Ann. der Physik und Chemie, vol. 67 (English Translation of title: Propagation of electro-dynamic waves along a cylindric conductor), Dec. 1899, pp. 233-290. As noted in the accompanying Transmittal Letter, no English translation is available to the Applicant.

Wikipedia, "Surface Wave", retrieved from the internet at http://en.wikipedia.org/wiki/Surface_wave, at least as early as Mar. 16, 2015, 7 pages.

Zenneck, "Über die Fortpflanzung ebener elektromagnetischer Wellen längs einer ebenen Leiterfläche und ihre Beziehung zur drahtlosen Telegraphie", Ann. der Physik, vol. 23 (English Translation of title: "About the propagation of electromagnetic plane waves along a conductor plane and their relationship to wireless telegraphy"), Sep. 1907, pp. 846-866. As noted in the accompanying Transmittal Letter, no English translation is available to the Applicant.

* cited by examiner

DOWNHOLE FLUID DETECTION USING SURFACE WAVES

CROSS-REFERENCE TO RELATED APPLICATIONS

This is a U.S. national phase under 35 U.S.C. 371 of International Patent Application No. PCT/2015/019872 titled "Downhole Fluid Detection Using Surface Waves" and filed Mar. 11, 2015, the entirety of which is incorporated herein by reference.

TECHNICAL FIELD

The present disclosure relates generally to devices for use in well systems. More specifically, but not by way of limitation, this disclosure relates to detecting fluid and information about fluid downhole in a wellbore using surface waves.

BACKGROUND

A well system (e.g., oil or gas wells for extracting fluids from a subterranean formation) can include a wellbore drilled into a formation. A casing string can be positioned in the wellbore to prevent walls of the wellbore from caving in. Cement can be pumped into a space between the casing string and the walls of the wellbore (or the walls of another casing string). The cement can bond the casing string to the walls of the wellbore (or the other casing string).

The properties of the cement can change as the cement sets. For example, the physical state of the cement can change from a fluid state to a solid state. It can be challenging to detect and communicate information about the fluid to the well surface efficiently.

DETAILED DESCRIPTION

Certain aspects and features of the present disclosure are directed to detecting fluid downhole using surface waves. Two transceivers can be positioned in a wellbore and can include antennas. One transceiver can apply power to an antenna with a frequency that is within a particular frequency range to generate surface waves. In some examples, the other transceiver can use an antenna to detect the presence or absence of surface waves. The other transceiver can determine, based on the presence or absence of the surface waves, the location of a fluid in the wellbore (e.g., if the fluid is positioned between the transceivers).

A surface wave can include an electromagnetic wave that propagates along an interface surface between two different media (e.g., two different solids or fluids) and does not produce electromagnetic radiation. The surface wave can include an electric field, a magnetic field, or both that are not transverse (e.g., not perpendicular) to the direction of propagation. For example, the electric field, the magnetic field, or both can be oriented in the direction of propagation (e.g., parallel to the direction of propagation) of the electromagnetic wave. As another example, the electric field, the magnetic field, or both can be at an acute angle to the direction of propagation of the electromagnetic wave.

Surface waves can differ from other types of electromagnetic waves in multiple ways. For example, absorption of surface wave's energy can be strictly within the media through which the surface wave propagates. This absorption of energy can be very closely confined to a thin volume of material on either side of the interface surface. This is unlike other forms of electromagnetic waves, which may carry energy away from the media from which the electromagnetic waves originate or through which the electromagnetic waves propagate. For example, other forms of electromagnetic waves that propagate through, for example, a waveguide can leak energy through the waveguide and emit radiation into the media surrounding the waveguide.

In some examples, the transceiver may be able to generate surface waves if a particular fluid (e.g., cement) is positioned between the transceivers. In such an example, the transceiver may be unable to generate surface waves if the fluid is not positioned between the transceivers. In other examples, the transceiver may be able to generate surface waves if an insulator is positioned between the transceivers. For example, the transceiver can generate high-frequency (e.g., 1 GHz) surface waves if air is positioned between the transceivers. The transceiver may be unable to generate high-frequency surface waves if a conductive fluid is positioned between the transceivers. For example, if cement is positioned between the transceivers, the high-frequency surface waves may attenuate or disappear. Thus, the presence or absence of surface waves with particular characteristics can indicate whether a fluid is positioned between the transceivers.

In some examples, the transceivers can communicate the location of the fluid to a well operator (e.g., at a surface of the wellbore) using a variety of transmission modes. For example, the transceivers can communicate the using magnetic induction, acoustic transmissions, vibrations, mud pulse telemetry, surface waves, radio frequency communications, pulsed optical signals, a wireline, or a fiber optic cable. In some examples, multiple transceivers can be positioned in the wellbore. The transceivers can each receive and relay the data, so that the data is communicated in segments or "hops", using one of the above transmission modes to a destination.

In some examples, the transceivers can select a transmission mode from among multiple available transmission modes based on a property of the casing string, cement in the wellbore (e.g., surrounding the casing string), a fluid in the wellbore, a proximity to the wellbore surface, a distance between the transceivers, or any combination of these. For example, the transceivers can switch between one or more wireless transmission modes based on the physical state of cement positioned between the transceivers. If the cement is closer to a fluid state, the transceivers can use acoustic transmissions to communicate data. As the cement sets, however, the amplitude of the acoustic transmissions can attenuate. The transceivers can detect this attenuation and switch to another wireless transmission mode, such as using vibrations (e.g., vibrating the casing string or the cement). This can allow the transceivers to communicate with improved efficiency.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
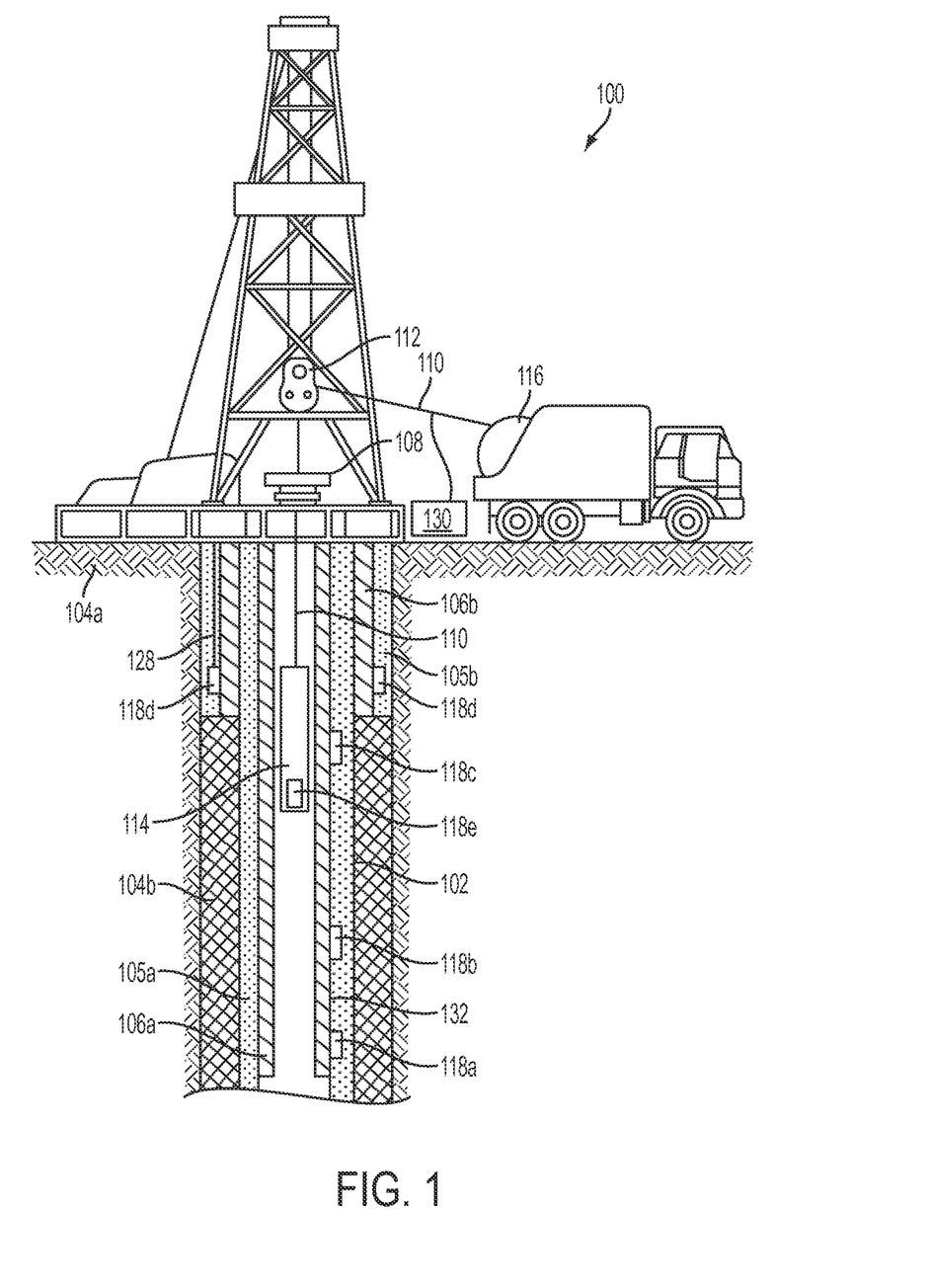
FIG. 1 is a cross-sectional view of an example of a well system that includes a system for detecting fluid downhole.

FIG. 1 is a cross-sectional view of an example of a well system 100 that includes a system for detecting fluid downhole. The well system 100 includes a wellbore 102 extending through various earth strata. The wellbore 102 extends through a hydrocarbon bearing subterranean formation 104a-b. A casing string 106a (e.g., a production casing) extends from the surface 108 to the subterranean formation 104a-b. The casing string 106a can provide a conduit through which formation fluids, such as production fluids produced from the subterranean formation 104a-b, can travel from the wellbore 102 to the surface 108. The casing string 106a can be coupled to the walls of the wellbore 102 via cement. For example, a cement sheath 105a can be positioned or formed between the casing string 106a and the walls of the wellbore 102 for coupling the casing string 106a to the wellbore 102.

Another casing string 106b (e.g., an intermediate casing) can be positioned between the cement sheath 105a and the subterranean formation 104a. Another cement sheath 105b can be positioned between the casing string 106b and the walls of the wellbore 102 for coupling the casing string 106b to the wellbore 102.

The well system 100 can also include at least one well tool 114 (e.g., a formation-testing tool). The well tool 114 can be coupled to a wireline 110, slickline, or coiled tube that can be deployed into the wellbore 102. The wireline 110, slickline, or coiled tube can be guided into the wellbore 102 using, for example, a guide 112 or winch. In some examples, the wireline 110, slickline, or coiled tube can be wound around a reel 116.

The well system 100 can include transceivers 118a-e. In some examples, the transceivers 118a-e can be positioned external to a casing string 106a-b. A transceiver 118a-e can be positioned external to the casing string 106a-b if it is positioned on or outside of an external diameter or an outer wall of the casing string 106a-b. In some examples, the transceivers 118a-d can be positioned on, partially embedded within, or fully embedded within a casing string 106a-b, a cement sheath 105a-b, or both. For example, the transceivers 118a-d can be positioned on an outer housing of (e.g., an outer surface of) a casing string 106a-b, within a cement sheath 105a-b, or within the subterranean formation 104a-b. As another example, a transceiver 118d can be positioned coaxially around an outer housing of a casing string, such as casing string 106b.

Positioning the transceivers 118a-d externally to a casing string 106a-b can be advantageous over positioning the transceivers 118a-d elsewhere in the well system 100. For example, positioning the transceivers 118a-c within an inner diameter of the casing string 106a can affect an internal drift diameter of the casing string 106a. Positioning the transceivers 118a-c externally to the casing string 106a-b, however, may not affect the internal drift diameter of the casing string 106a. Additionally, positioning the transceivers 118a-d externally to a casing string 106a-b can allow the transceivers 118a-d to more accurately and efficiently detect characteristics of the subterranean formation 104a-b, a cement sheath 105a-b, and a casing string 106a-b.

The transceivers 118a-e can communicate with each other via a wired or wireless interface. In some examples, the transceiver 118d can receive data from another transceiver 118c and relay the data to the surface 108 (e.g., to a computing device 130 positioned at the surface 108). For example, the transceiver 118b can wirelessly transmit data to transceiver 118c, the transceiver 118c can wirelessly relay the data to transceiver 118d, and transceiver 118d can relay the data to the surface 108 via a wired interface 128 (e.g., a wireline or fiber optic cable) or a wireless interface. In some examples, a transceiver 118e can be positioned within the well tool 114. The transceiver 118e can receive data from another transceiver 118c and relay the data to the surface 108. For example, the transceiver 118b can wirelessly transmit data to transceiver 118c, the transceiver 118c can wirelessly relay the data to transceiver 118e, and transceiver 118e can relay the data to the surface 108 via the wireline 110. In this manner, the transceivers 118a-e can relay data in segments or "hops" to a destination.

The transceivers 118a-e can wirelessly communicate with each other, or a computing device 130 at the surface 108 of the wellbore 102, using any combination of wireless protocols. For example, the transceivers 118a-e can communicate using magnetic induction, acoustic transmissions, vibrations, mud pulse telemetry, surface waves, radio frequency communications, and pulsed optical signals. In some examples, the transceivers 118a-e can communicate with each other, or a computing device 130 at the surface 108 of the wellbore 102, using wired interfaces (e.g., wires or fiber optic cables).

In some examples, each of the transceivers 118a-e can select a wireless protocol for transmitting data based on a property of a casing string 106a-b, a cement sheath 105a-b, a fluid (e.g., cement, mud, or a hydrocarbon) in the wellbore 102, a proximity to the surface 108 of the wellbore 102, a distance between the transceivers 118a-e, or any combination of these. For example, transceiver 118a can determine (e.g., using a sensor) that there is no mud between transceiver 118a and transceiver 118b, rendering mud pulse telemetry ineffective. Transceiver 118a can switch from a mud pulse telemetry mode to a magnetic induction mode and transmit data to transceiver 118b using magnetic induction.

In some examples, at least two of the transceivers 118a-e can use different transmission modes to transmit data. For example, transceiver 118b can transmit data to transceiver 118c using an optical fiber. The optical fiber can be positioned in the casing string 106a. It can be challenging to transmit data from transceiver 118c to transceiver 118e using an optical fiber (or another wired interface), however, because the transceiver 118c is positioned on the casing string 106a and transceiver 118e is positioned in the well tool 114. In some examples, transceiver 118c can transmit the data to transceiver 118e using a wireless transmission mode, such as magnetic induction.

As another example, the transceiver 118b can transmit data to transceiver 118c using a surface wave. A surface wave can include an electromagnetic wave in which the electric field, the magnetic field, or both are non-transverse (e.g., not orthogonal) to the direction of propagation. For example, the electric field, the magnetic field, or both can be oriented at an acute angle to the direction of propagation of the electromagnetic wave. The surface wave can propagate along an interface surface between different media (e.g., two different solids or fluids). For example, the surface wave can propagate along the interface surface 132 between the casing string 106a and the cement sheath 105a. In some examples, wireless communications using surface waves can be advantageous because they can travel longer distances with less attenuation than other forms of wireless communication (e.g., magnetic induction). Communicating data between transceivers 118c-d using surface waves can be less effective, however, if the transceivers 118c-d are positioned on different casing strings 106a-b. In some examples, the transceiver 118c can receive the surface wave and, because the transceivers 118c-d are positioned on different casing strings 106a-b, relay the data to the transceiver 118d using another transmission mode, such as magnetic induction.

Figure 2:
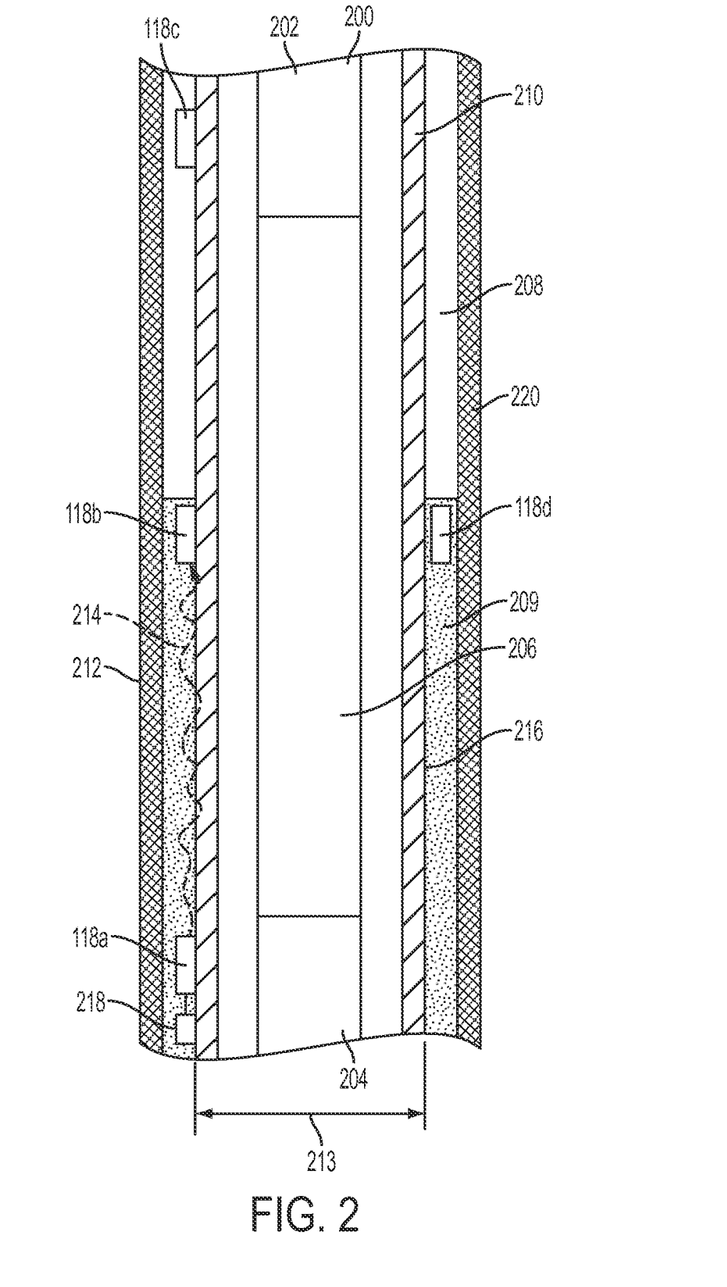
FIG. 2 is a cross-sectional side view of an example of part of a system for detecting fluid downhole.

FIG. 2 is a cross-sectional side view of part of a system for detecting fluid downhole that includes transceivers 118a-d. The transceivers 118a-c can be positioned on a casing string 210 in a wellbore 220. Cement 209 can couple a portion of the casing string 210 to the subterranean formation 212. The cement 209, however, may not extend the full longitudinal length of a space between the casing string 210 and the subterranean formation 212. This can generate an annulus 208 between a portion of the casing string 210 and the subterranean formation 212. In some examples, a well tool 200 can be positioned within the casing string 210. The well tool 200 can include multiple subsystems 202, 204, 206.

In some examples, the transceivers 118a-c can wirelessly communicate data using surface waves 214. For example, each of the transceivers 118a-c can apply power to an antenna at a frequency within a specific frequency range. The specific frequency range can include a range of frequencies (e.g., 1 kHz to 1 MHz) that causes the antenna to generate surface waves. In some examples, transmitting power to the antenna at a frequency outside the specific frequency range can cause the antenna to generate inductive fields, rather than surface waves. Another transceiver 118a-c can receive the surface wave 214, effectuating wireless communication.

In some examples, the specific frequency range can depend on the characteristics of the casing string 210. For example, the specific frequency range can depend on a diameter 213 of the casing string 210, the conductivity of the casing string 210, the magnetic permeability of the casing string 210, or any combination of these. The specific frequency range can also depend on characteristics of the cement 209 adjacent to the casing string 210. For example, the specific frequency range can depend on the conductivity of the cement 209, the dielectric constant of the cement 209, the magnetic permeability of the cement 209, the physical state of the cement (e.g., solid or liquid) or any combination of these. In one example, if the diameter of the casing string 210 is 196.85 millimeters and the cement 209 has a conductivity of 1 semen/meter and is in a substantially solid state, the specific frequency range can be between 10 kHz and 700 kHz. Applying power to an antenna at a frequency within an specific frequency range can cause the transceiver 118a to generate a surface wave 214. The surface wave 214 can propagate along the interface surface 216 between the cement 209 and the casing string 210.

More specifically, in some examples, assuming that the casing string 210 is cylindrical, and defining "z" as a z-axis that is an axis of symmetry of the casing string 210, a radial coordinate "r" as orthogonal to the z-axis, and a polar coordinate θ, the surfaces waves 214 can propagate along the casing string 210 according to the following mathematical equations:

$$H_\theta = 2i * A * \left(\frac{\epsilon 1}{\pi * r\sigma * \mu_0 * \sigma_{\mathit{eff}}}\right) * e^{-\sqrt{\frac{\omega * \mu_0 * \sigma_{\mathit{eff}}}{2}}(1+i)*z} * \left(\frac{1}{r}\right)$$

$$E_z = \frac{2i}{\pi} * A * e^{-\sqrt{\frac{\omega * \mu_0 * \sigma_{\mathit{eff}}}{2}}(1+i)*z} * \left(\frac{3i*\pi}{4} + \mathrm{Ln}\left[r\sqrt{r\sigma}\sqrt{\omega * \mu_0 * \sigma_{\mathit{eff}}}\right]\right)$$

$$E_r = -2 * A * \left(\frac{1}{\pi * r\sigma * \sqrt{\omega * \mu_0 * \sigma_{\mathit{eff}}}}\right) * e^{i*\frac{\pi}{4}} * e^{-\sqrt{\frac{\omega * \mu_0 * \sigma_{\mathit{eff}}}{2}}(1+i)*z} * \left(\frac{1}{r}\right)$$

where $H_\theta$ is the polar component of magnetic field intensity outside of the casing string 210; $E_z$ is the electric field component along the casing string 210; $E_r$ is the radial component of the electric field (e.g., orthogonal to the casing string 210); A is the source-dependent amplitude; $i=\sqrt{-1}$; $\epsilon 1$ is the effective dielectric constant of the casing string 210; $\mu_0 = 4\pi(10^{-7})$ Henrys/meter, the permeability of free space;

$$\sigma_{\mathit{eff}} \equiv \frac{\sigma_1 * \sigma_2}{\sigma_1 + \sigma_2};$$

$$r\sigma \equiv \frac{\sigma_2}{\sigma_1};$$

$\sigma_1$ is the conductivity (in mhos/m) of the material within the casing string 210; $\sigma_2$ is the conductivity (in mhos/m) of the material outside of the casing string 210; and ω is equal to 2 πf, where f is the frequency in Hertz. In some examples, $\sigma_1 \gg \sigma_2$ so that $\sigma_{\mathit{eff}} \sim \sigma_2$ and $r\sigma \ll 1$. In some examples, because $E_z$ is not vanishing, the electric field can be tilted with respect to a normal direction to the casing string 210.

The surface waves 214 can propagate along the z-axis according to the following mathematical equation:

$$e^{-\sqrt{\frac{\omega * \mu_0 * \sigma_{\mathit{eff}}}{2}}*z} * \left(\frac{1}{r}\right)$$

where $$\sqrt{\frac{\omega * \mu_0 * \sigma_{\mathit{eff}}}{2}}$$

is the reciprocal of the "skin depth" in the medium outside of the casing string 210. Because of this factor, in some examples, the frequency should be kept as low as possible while sustaining the required data rate.

In some examples, the transceivers 118a-c can generate surface waves 214 in which the z-axis component of electric field outside of the casing string 210 (which can be defined as $E_z$) and the radial component of electric field outside of the casing string 210 (which can be defined as $E_r$) are non-vanishing, and which has only a polar component of the magnetic field intensity (which can be defined as $H_\theta$). Such surface waves 214 can be generated using any type of antenna capable of producing an electric field parallel to the axis of the casing string 210. For example, the transceivers 118a-c can use an electric dipole antenna with a non-vanishing projection of the dipole moment along the z-axis of the casing string 210 or a toroid antenna, where the projection of the axis of the toroid onto the axis of the casing string is non-vanishing.

In some examples, the transceivers 118*a-c* can generate surface waves 214 in which the z-axis component of the magnetic field outside the casing string 210 (which can be defined as $H_z$) and the radial component of the magnetic field outside of the casing string 210 (which can be defined as $H_r$) are non-vanishing, and which has only a polar component of the electric field (which can be defined as $E_\theta$). Such surface waves 214 can be generated using any type of antenna capable of producing a magnetic field parallel to the axis of the casing string 210. For example, the transceivers 118*a-c* can use a magnetic dipole antenna with a non-vanishing projection of the dipole moment along the z-axis of the casing string 210.

The surface wave 214 can include an electric field, a magnetic field, or both that can be oriented at an acute angle to a direction of propagation of the surface wave 214 (e.g., the direction from 118*a* to 118*b*). An acute angle can include an angle that is less than 90 degrees (e.g., between 0 and 89 degrees). For example, the electric field, magnetic field, or both can be oriented at an angle of 50 degrees to a direction of propagation of the surface wave 214. As another example, the electric field, magnetic field, or both can be at an acute angle when oriented at an angle of 130 degrees (e.g., in the counter-clockwise direction from the direction of propagation), because a supplementary angle (e.g., in the clockwise direction from the direction of propagation) is 50 degrees.

In some examples, the transceivers 118*a-c* can generate Sommerfeld-Goubau surface waves using very high frequencies (e.g., above 50 MHz). In some examples, the transceivers 118*a-c* can include a horn antenna for generating Sommerfeld-Goubau surface waves. The horn antenna can be positioned coaxially around the casing string 210, or facing along a longitudinal axis of the casing string 210. In some examples, Sommerfeld-Goubau surface waves can propagate well along an interface surface 216 between a conductive material (e.g., the casing string 210) and an insulator, such as air. These surface waves may rapidly attenuate, however, if the interface surface 216 is between two conductive materials, such as the casing string 210 and cement 209. The transceivers 118*a-c* can detect the presence or absence of Sommerfeld-Goubau surface waves and determine whether a conductive substance is positioned between the transceivers 118*a-c*. For example, when air is positioned between the transceivers 118*a-b*, a transceivers 118*a* may be able to generate Sommerfeld-Goubau surface waves detectable by another transceiver 118*b*. The transceiver 118*b* can detect the Sommerfeld-Goubau surface waves and determine that there is air positioned between the transceivers 118*a-b*. If cement 209 enters the space between the transceivers 118*a-b*, the Sommerfeld-Goubau surface waves may attenuate or otherwise become undetectable. The transceiver 118*b* can detect this attenuation or reduction in Sommerfeld-Gobau surface waves and determine that cement 209 is positioned between the transceivers 118*a-b*.

In some examples, the surface wave 214 can include a Zenneck surface wave, a Sommerfeld surface wave, a radial-cylindrical surface wave, an axial-cylindrical surface wave, or any combination of these. The type of surface wave 214 can depend on the geometry of the interface surface 216 between the casing string 210 and the cement 209. For example, the cylindrical geometries of the casing string 210 and the cement 209 (e.g., when hardened) can allow the transceivers 118*a*, 118*b* to generate Zenneck surface waves and Sommerfeld surface waves, or radial-cylindrical surface waves and axially-cylindrical surface waves, respectively.

In some examples, a transceiver 118*a-c* can include or be electrically coupled to a sensor 218. In the example shown in FIG. 2, the transceiver 118*a* is electrically coupled to the sensor 218 by a wire. Examples of the sensor 218 can include a pressure sensor, a temperature sensor, a microphone, an accelerometer, a depth sensor, a resistivity sensor, a vibration sensor, a fluid sensor, or a fluid flow sensor.

In some examples, the sensor 218 can transmit sensor signals to a processor (e.g., associated with a transceiver 118*a*). The sensor signals can be representative of sensor data. The processor can receive the sensor signals and cause the transceiver 118*a* to communicate the sensor data to another transceiver 118*b*. For example, the processor can transmit signals to an antenna (e.g., a toroid antenna or a solenoid antenna) to generate surface waves in a particular sequence representative of the sensor data. In other examples, the sensor 218 can additionally or alternatively transmit sensor signals to an electrical circuit. The electrical circuit can include operational amplifiers, integrated circuits, filters, frequency shifters, capacitors, an electrical-to-optical converter, inductors, and other electrical circuit components. The electrical circuit can receive the sensor signal and perform one or more functions (e.g., amplification, frequency shifting, filtering, conversion of electrical signals to optical pulses) to cause the transceiver 118*a* to generate a wired or wireless communication. For example, the electrical circuit can amplify and frequency shift the sensor signals into a radio frequency range, and transmit the amplified and frequency-shifted signal to an antenna. This can cause the antenna to generate a radio frequency communication that is representative of the sensor signals.

In some examples, the transceivers 118*a-d* can analyze wireless communications from each other to determine information about the wellbore environment. The information can include whether or not a particular substance is present in a particular location in the wellbore 220, the physical state of the substance (e.g., whether the substance is a liquid, solid, gas, or in-between any two of these physical states), a conductivity of the substance, a pressure or temperature, or any combination of these.

In some examples, the presence or absence of a communication from another transceiver 118*a-d* can be indicative of information about the wellbore environment. For example, cement 209 can be pumped into the wellbore 220. Each of the transceivers 118*a-c* can apply power (e.g., continuously or in bursts) to an antenna at a frequency within a specific frequency range. If the cement 209 surrounds two of the transceivers 118*a-b*, the antennas can generate surface waves that propagate between the transceivers 118*a-b*. The transceivers 118*a-b* can detect the presence of the surface waves and determine that the cement is surrounding locations in which both of the transceivers 118*a-b* are positioned (e.g., that the cement has reached a particular level or location in the wellbore). As another example, if cement does not surround two of the transceivers 118*b-c*, the transceivers 118*b-c* may be unable to generate surface waves that propagate between the transceivers 118*b-c*. The transceivers 118*b-c* can detect the lack of surface waves and determine that the cement is not surrounding or positioned between the transceivers 118*b-c*. The transceivers 118*a-d* can communicate (e.g., wirelessly) whether the cement is detected at particular locations in the wellbore to a well operator, which can improve cementing operations.

In some examples, the transceivers 118*a-c* can detect a characteristic of a wireless transmission, such as an amplitude, phase, and frequency of the wireless transmission. The transceivers 118a-c can determine information about the wellbore environment based on the characteristic. For example, the transceiver 118a can wirelessly communicate, at predetermined intervals (e.g., once per minute), calibration data to the transceiver 118b. The transceiver 118b can analyze the characteristics of the wireless communication and store (e.g., in memory) an amplitude, phase, and frequency of the wireless communication. If the amplitude, phase, and frequency of the wireless communications remain substantially similar between intervals, the transceiver 118b can determine that a wellbore environment (e.g., the temperature, pressure, or presence or lack of a substance) between the transceivers 118a-b has remained substantially constant. If the amplitude, phase, or frequency of the wireless communications changes (e.g., due to cement being pumped between the transceivers 118a-b), the transceiver 118b can determine that the wellbore environment has changed. The transceiver 118b can communicate this change to a wellbore operator.

As a particular example, cement 209 can be pumped into the wellbore 220 (e.g., to form a cement sheath). Each of the transceivers 118a-c can apply power to an antenna at a frequency within a low frequency band or a high frequency band to generate low-frequency surface waves or high-frequency surface waves (e.g., Sommerfeld-Goubau surface waves), respectively. If the cement (e.g., liquid cement) surrounds two of the transceivers 118a-b, the antennas can generate surface waves that have low amplitudes and may be unable to propagate between the transceivers 118a-b. The transceivers 118a-b can detect the low amplitudes or lack of surface waves and determine that the cement is surrounding locations in which both of the transceivers 118a-b are positioned. As another example, if air surrounds the transceivers 118b-c, the transceivers 118b-c can generate surface waves that have high amplitudes and can propagate between the transceivers 118b-c. The transceivers 118b-c can detect the high amplitude of the surface waves and determine that the cement is not surrounding or positioned between the transceivers 118b-c. The transceivers 118a-c can communicate whether the cement is detected at particular locations in the wellbore to a well operator.

As another example, cement 209 can be pumped into the wellbore 220. Each of the transceivers 118a-c can apply power to an antenna at a frequency within a mid-range frequency band. If the cement surrounds two of the transceivers 118a-b, the antennas can generate surface waves that have high amplitudes and propagate between the transceivers 118a-b. The transceivers 118a-b can detect the high amplitudes and determine that the cement is surrounding locations in which both of the transceivers 118a-b are positioned. As another example, if cement does not surround the transceivers 118b-c, the transceivers 118b-c may generate surface waves that have low amplitudes and propagate between the transceivers 118b-c. The transceivers 118b-c can detect the low amplitude of the surface waves and determine that the cement is not surrounding or positioned between the transceivers 118b-c. As discussed above, the transceivers 118a-c can communicate whether the cement is detected at particular locations in the wellbore to a well operator.

In some examples, the transceivers 118a-c can determine a type of a substance, or a conductivity of a substance, positioned between the transceivers 118a-c. The transceivers 118a-c can determine the type or conductivity of the substance based on changes in amplitudes, frequencies, and phases between multiple wireless communications. For example, air can be positioned between the transceivers 118a-b, causing a wireless communication between the transceivers 118a-b to have a low amplitude. Thereafter, if cement or another conductive material is positioned between the transceivers 118a-b, a wireless communication between the transceivers 118a-b can have a lower amplitude. The transceiver 118b can detect the decrease in amplitude and determine that cement, or another material, is positioned between the transceivers 118a-b.

In some examples, a transceiver 118d can be positioned in the cement 209. For example, a transceiver 118d can be floating in, or near a surface of, the cement 209. The transceiver 118d can communicate data to the transceivers 118a-c positioned on the casing string 210. For example, the transceiver 118d can float near a surface of the cement 209 and transmit a wireless signal (e.g., continuously or in pulses) detectable by another transceivers 118a-c. In one example, the transceiver 118d can include a radio frequency identification (RFID) tag readable by other transceivers 118a-c. As cement 209 is pumped into the wellbore 220, the position of the transceiver 118d in the wellbore 220 can change. If the position of the transceiver 118d is within a range of another transceiver 118a-c, the other transceiver 118a-c can detect the wireless signal, determine that the cement 209 has reached a particular location in the wellbore 220, and transmit the cement location to a well operator.

Figure 3:
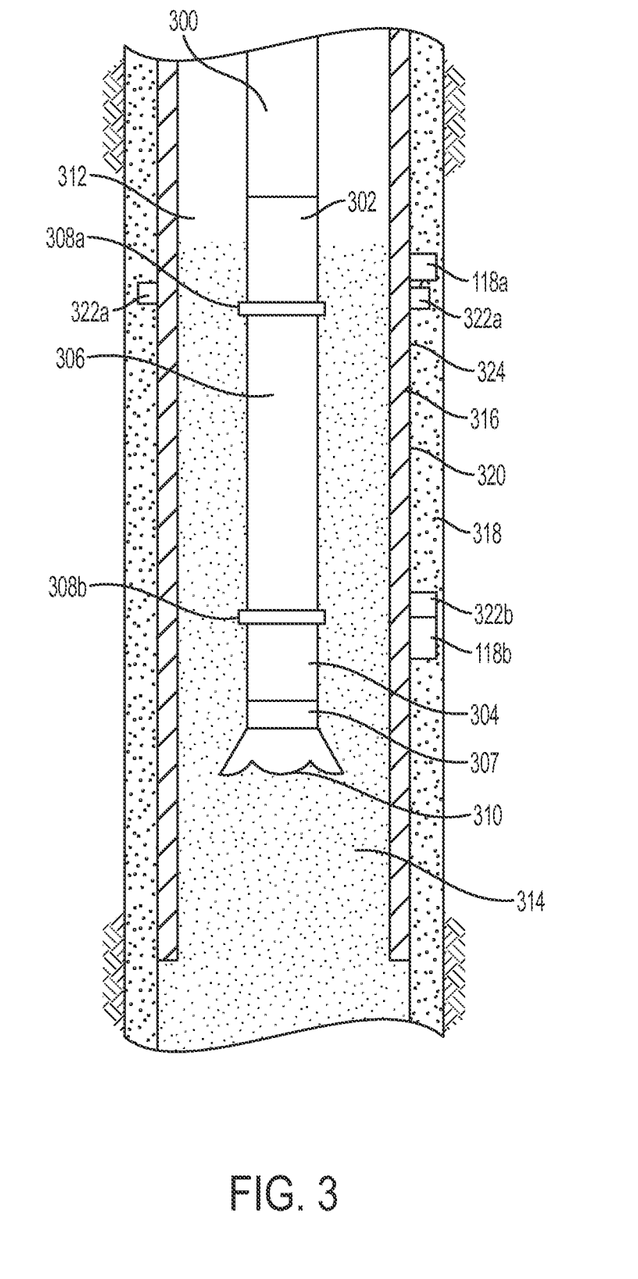
FIG. 3 is a cross-sectional side view of another example of a part of a well system that includes a system for detecting fluid downhole.

FIG. 3 is a cross-sectional side view of another example of a part of a well system that includes a system for detecting fluid downhole. In this example, the well system includes a wellbore. The wellbore can include a casing string 316 and a cement sheath 318. An interface surface 320 can couple the casing string 316 to the cement sheath 318. The wellbore can include a fluid 314. The fluid 314 (e.g., mud) can flow in an annulus 312 positioned between the well tool 300 and a wall of the casing string 316.

A well tool 300 (e.g., logging-while-drilling tool) can be positioned in the wellbore. The well tool 300 can include various subsystems 302, 304, 306, 307. For example, the well tool 300 can include a subsystem 302 that includes a communication subsystem. The well tool 300 can also include a subsystem 304 that includes a saver subsystem or a rotary steerable system. A tubular section or an intermediate subsystem 306 (e.g., a mud motor or measuring-while-drilling module) can be positioned between the other subsystems 302, 304. In some examples, the well tool 300 can include a drill bit 310 for drilling the wellbore. The drill bit 310 can be coupled to another tubular section or intermediate subsystem 307 (e.g., a measuring-while-drilling module or a rotary steerable system).

The well tool 300 can also include tubular joints 308a, 308b. Tubular joint 308a can prevent a wire from passing between one subsystem 302 and the intermediate subsystem 306. Tubular joint 308b can prevent a wire from passing between the other subsystem 304 and the intermediate subsystem 306. The tubular joints 308a, 308b may make it challenging to communicate data through the well tool 300. It may be desirable to communicate data externally to the well tool 300, for example, using transceivers 118a-b.

The transceivers 118a-b can be positioned on the casing string 316. The transceivers 118a-b can communicate data using a wired or wireless transmission mode. In some examples, the transceivers 118a-b can include antennas 322a-b. The antennas 322a-b can be positioned on the casing string 316. In some examples, an antenna 322a can be positioned coaxially around the casing string 316. For example, the antenna 322a can be electrically coupled to a transceiver 118a (e.g., by a wire extending through the casing string 316 or cement sheath 318) and positioned coaxially around an outer housing 324 of the casing string 316. As discussed above, in some examples, the transceivers 118a-b can wirelessly communicate data or detect the location of a fluid (e.g., cement) by generating surface waves that propagate along the interface surface 320.

Figure 4:
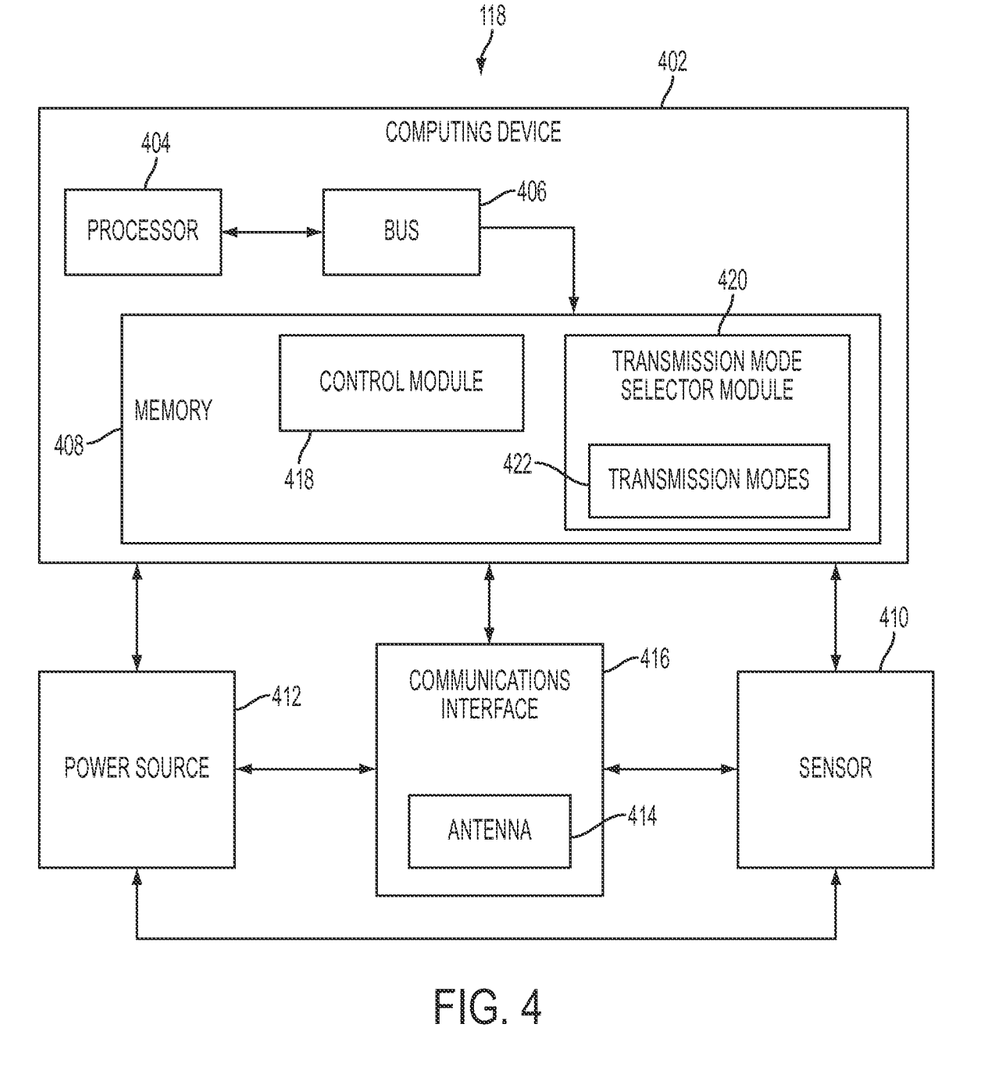
FIG. 4 is a block diagram of an example of a transceiver for detecting fluid downhole.

FIG. 4 is a block diagram of an example of a transceiver for detecting fluid downhole. In some examples, the components shown in FIG. 4 (e.g., the computing device 402, power source 412, and communications interface 416) can be integrated into a single structure. For example, the components can be within a single housing. In other examples, the components shown in FIG. 4 can be distributed (e.g., in separate housings) and in electrical communication with each other.

The transceiver 118 can include a computing device 402. The computing device 402 can include a processor 404, a memory 408, and a bus 406. The processor 404 can execute one or more operations for operating a transceiver. The processor 404 can execute instructions stored in the memory 408 to perform the operations. The processor 404 can include one processing device or multiple processing devices. Non-limiting examples of the processor 404 include a Field-Programmable Gate Array ("FPGA"), an application-specific integrated circuit ("ASIC"), a microprocessor, etc.

The processor 404 can be communicatively coupled to the memory 408 via the bus 406. The non-volatile memory 408 may include any type of memory device that retains stored information when powered off. Non-limiting examples of the memory 408 include electrically erasable and programmable read-only memory ("EEPROM"), flash memory, or any other type of non-volatile memory. In some examples, at least some of the memory 408 can include a medium from which the processor 404 can read instructions. A computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

The memory 408 can include various modules 418, 420 for enabling communications downhole. In some examples, the memory 408 can include a transmission mode selector module 420. The transmission mode selector module 420 can include instructions for selecting among multiple transmission modes 422 to use to transmit data. For example, the transmission mode selector module 420 can include instructions for selecting among multiple wired transmission modes, such transmitting data via a wireline or fiber optic cable, and wireless transmission modes, such as transmitting data via acoustic transmissions or surface waves.

In some examples, the memory 408 can include a control module 418. The control module 418 can include instructions for receiving data from a sensor 410, communications interface 416, or both and operating the transmission mode selector module 420 based on the data. For example, the control module 418 can cause the transmission mode selector module 420 to select a transmission mode among stored transmission modes 422 that uses inductive coupling based on the data.

In some examples, the control module 418 can include instructions for receiving a wireless communication from another transceiver 118. The control module 418 can include instructions for operating the transmission mode selector module 420 based a characteristic of the wireless communication. For example, the control module 418 can include instructions for determining, based on the amplitude, frequency, and phase of the wireless communication, a transmission mode among available transmission modes 422 and operating the transmission mode selector module 420 to select the transmission mode among the transmission modes 422.

Although the modules 418, 420 are depicted in FIG. 4 as software components within memory 408, in some examples, the modules 418, 420 can include hardware. For example, modules 418, 420 can include analog to digital converters, processors, microcontrollers, comparators, amplifiers, transistors, and/or other analog or digital circuitry. In some examples, the modules 418, 420 can be at least partially external to memory 408. For example, the modules 418, 420 can include hardware and/or software components separate from memory 408.

The transceiver 118 can include a power source 412. The power source 412 can be in electrical communication with the computing device 402, the communications interface 416, and the sensor 410. In some examples, the power source 412 can include a battery (e.g. for powering the transceiver 118). In other examples, the transceiver 118 can be coupled to and powered by an electrical cable (e.g., a wireline).

Additionally or alternatively, the power source 412 can include an AC signal generator. The computing device 402 can operate the power source 412 to apply a transmission signal to the antenna 414. For example, the computing device 402 can cause the power source 412 to apply a voltage with a frequency within a specific frequency range to the antenna 414. This can cause the antenna 414 to generate a surface wave, which can be transmitted to another transceiver 118. In other examples, the computing device 402, rather than the power source 412, can apply the transmission signal to the antenna 414.

The transceiver 118 can include a communications interface 416. The communications interface 416 can include or can be coupled to an antenna 414. In some examples, part of the communications interface 416 can be implemented in software. For example, the communications interface 416 can include instructions stored in memory 408.

The communications interface 416 can detect signals from another transceiver 118. For example, the communications interface 416 can detect vibrations (e.g., via an accelerometer), acoustic transmissions (e.g., via a microphone), and mud pulses (e.g., via a pressure sensor) transmitted by another transceiver 118. In some examples, the communications interface 416 can detect signals via the antenna 414. For example, the communications interface 416 can detect surface waves, magnetic fields, and electric fields via the antenna 414 transmitted by another transceiver 118. In some examples, the communications interface 416 can amplify, filter, demodulate, frequency shift, and otherwise manipulate the detected signals. The communications interface 416 can transmit a signal associated with the detected signals to the processor 404. In some examples, the processor 404 can receive and analyze the signal to retrieve data associated with the detected signals.

In some examples, the processor 404 can analyze the data and perform one or more functions. For example, the processor 404 can generate a response based on the data. The processor 404 can cause a response signal associated with the response to be transmitted to the communications interface 416. The communications interface 416 can generate a transmission signal (e.g., via the antenna 414, a speaker, a vibrator, a valve, or a mud pulse telemetry system) to communicate the response to another transceiver 118. For example, the communications interface 416 can amplify, filter, modulate, frequency shift, and otherwise manipulate the response signal to generate the transmission signal. In this manner, the processor 404 can receive, analyze, and respond to communications from another transceiver 118.

As discussed above, the communications interface 416 can wirelessly transmit data via the antenna 414, a speaker, a vibrator, a valve, optical pulses (e.g., generated using a light emitting diode), or a mud pulse telemetry system. For example, the communications interface 416 can transmit surface waves that are modulated by data via the antenna 414. In some examples, the communications interface 416 can receive signals (e.g., associated with data to be transmitted) from the processor 404 and amplify, filter, modulate, frequency shift, and otherwise manipulate the signals. The communications interface 416 can transmit the manipulated signals to the antenna 414. The antenna 414 can receive the manipulated signals and responsively generate wireless communications (e.g., surface waves) that carry the data.

In some examples, the communications interface 416 can transmit data via a wired interface. For example, the communications interface 416 can transmit data via a wireline. As another example, the communications interface 416 can generate an optical waveform. The communications interface 416 may generate the optical waveform by pulsing a light emitting diode at a particular frequency. The communications interface 416 can transmit the optical waveform via an optical cable (e.g., a fiber optic cable).

The computing device 402 can include a sensor 410. Examples of the sensor 410 can include pressure sensors, temperature sensors, microphones, accelerometers, depth sensors, resistivity sensors, vibration sensors, ultrasonic transducers, fluid analyzers or sensors, RFID tags, and RFID readers. The sensor 410 can transmit data to the processor 404 (e.g., for analysis or communication to other transceivers 118).

Figure 5:
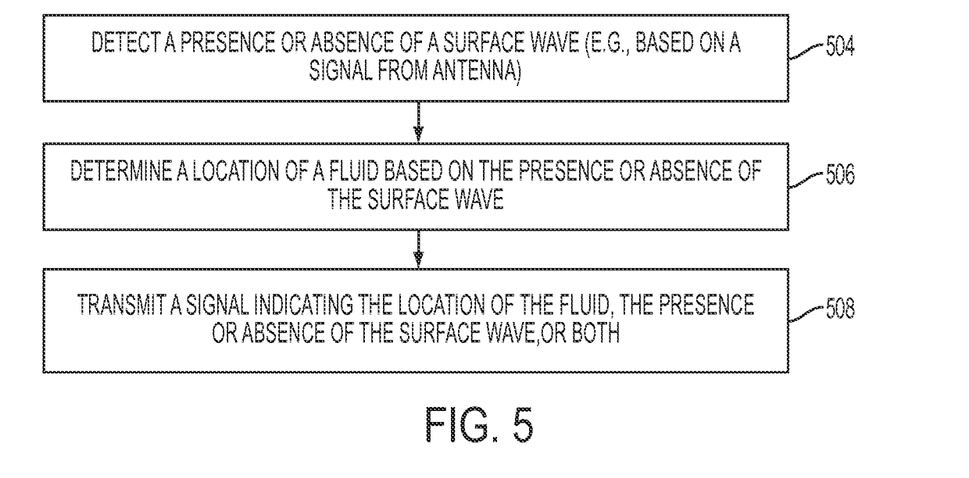
FIG. 5 is a flow chart showing an example of a process for detecting fluid downhole according to one example.

FIG. 5 is a flow chart showing an example of a process for detecting fluid downhole according to one example.

In block 504, the transceiver detects the presence or absence of the surface wave. In some examples, the transceiver can receive, from an antenna, a signal indicating the presence or absence of the surface wave. For example, the transceiver can detect one or more characteristics of the signal (e.g., the presence of the signal, or an amplitude, frequency, and phase of the signal). Based on the characteristics, the transceiver can detect the presence or absence of a surface wave. In some examples, if the signal has a voltage above a particular threshold, it can indicate the presence of a surface wave. If the signal has a voltage below the threshold, it can indicate the absence of a surface wave.

In block 506, the transceiver determines the location of a fluid based on the presence or absence of the surface wave. For example, the transceiver may be unable to detect a surface wave of the fluid is between the transceiver and another transceiver. In such an example, the absence of the surface wave can indicate that the fluid is positioned between the transceivers. The presence of the surface wave can indicate that the fluid is not positioned between the transceivers. In this manner, the transceiver can determine the location of the fluid.

In block 508, the transceiver transmits a signal indicating the location of the fluid, the presence or absence of the surface wave, or both. In some examples, the transceiver can transmit the signal using a particular transmission mode selected from among multiple available transmission modes. In other examples, the transceiver may not select a transmission mode. Rather, the transceiver may use the same transmission mode for every transmission. For example, the transceiver can be preprogrammed to use a particular transmission mode.

Figure 6:
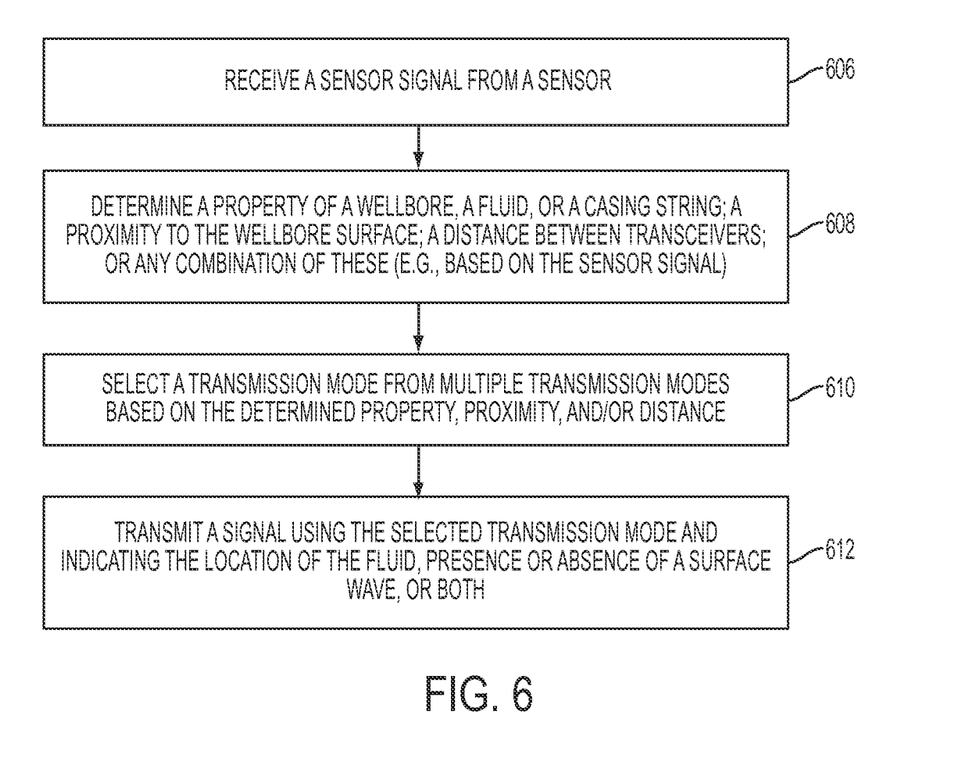
FIG. 6 is a flow chart showing another example of a process for detecting fluid downhole according to one example.

FIG. 6 is a flow chart showing another example of a process for detecting fluid downhole according to one example. In some examples, any of the steps shown in FIG. 6 can be included additionally or alternatively to any of the steps shown in FIG. 5. Some examples may not include all of the steps shown in FIG. 6.

In block 606, the transceiver receives a sensor signal from a sensor. Examples of the sensor can include a pressure sensor, a temperature sensor, a microphone, a resistivity sensor, a vibration sensor, or a fluid flow sensor. The sensor can transmit a sensor signal to the transceiver. The transceiver can be electrically coupled to the sensor for receiving sensor signals.

In block 608, the transceiver determines a property of a wellbore, a fluid (e.g., cement), or a casing string; a proximity to the wellbore surface; a distance between transceivers; or any combination of these. In some examples, the transceiver can determine the property, proximity, and distance, respectively, based on the sensor signal. For example, the transceiver can determine the conductivity of the fluid or the casing string based on a sensor signal from a resistivity sensor. In another example, the transceiver can determine the location and direction of the fluid based on a fluid flow sensor. In still another example, the sensor can include a gyroscope or global positioning system (GPS) for detecting an orientation and location, respectively, of the transceiver. The transceiver can determine the distance between transceivers, or to the well surface, based on the location, orientation, or both.

In some examples, a property of a wellbore, a fluid, or a casing string; a proximity to the wellbore surface; a distance between transceivers; or any combination of these can be preprogrammed into memory. For example, the conductivity of the casing string can be preprogrammed into memory. As another example, a user can preprogram into the transceiver's memory a distance from a transceiver's position in the wellbore to a surface of the wellbore and/or another transceiver. The transceiver can determine the property of the wellbore, fluid, casing string, or any combination of these by retrieving the preprogrammed data from memory.

In some examples, a transceiver can determine a location of the transceiver in the wellbore using a temperature, a pressure, or both. For example, the transceiver can use a sensor to detect a temperature, pressure, or both. The transceiver can use the temperature, pressure, or both to determine the location of the transceiver in the wellbore. For example, different locations in the wellbore may have different temperatures, pressures, or both. The transceiver can consult a lookup table stored in memory (or use an algorithm) to map a temperature, pressure, or both to a particular location in the wellbore. In some examples, the transceiver can receive a wireless communication from another transceiver indicative of a temperature, pressure, or both near the other transceiver. The transceiver can use the temperature, pressure, or both near the other transceiver to determine the location of the other transceiver (e.g., via the lookup table or an algorithm). The transceiver can compare its location to the location of the other transceiver to determine a distance between the transceivers.

In block 610, the transceiver selects a transmission mode from multiple transmission modes. The transceiver can select the transmission mode based on the determined property, proximity, distance, etc. For example, if the transceiver detects that the fluid has a high conductivity, the transceiver can select a transmission mode with high efficiency in a high conductivity environment (e.g., vibrations). If the transceiver detects that the fluid has a low conductivity, the transceiver can select a transmission mode with high efficiency in a low conductivity environment (e.g., surface waves). In some examples, the transceiver can select from among wired transmission modes, such as by wireline or fiber optic cable, and wireless transmission modes (e.g., as discussed above).

In block 612, the transceiver transmits a signal indicating the location of the fluid, the presence or absence of the surface wave, or both. The transceiver can transmit the signal using the transmission mode selected in block 610.

Figure 7:
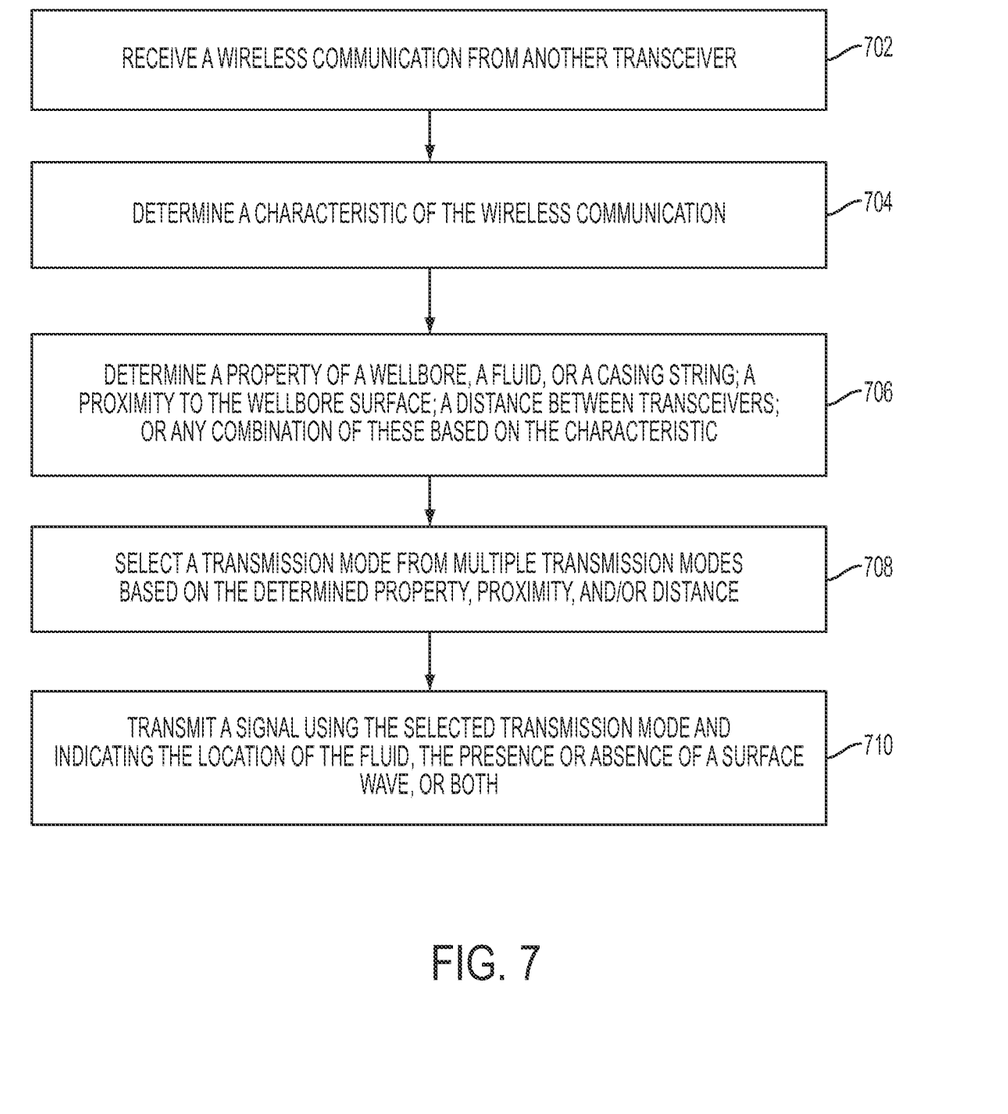
FIG. 7 is a flow chart showing still another example of a process for detecting fluid downhole according to one example.

FIG. 7 is a flow chart showing still another example of a process for detecting fluid downhole according to one example. In some examples, any of the steps shown in FIG. 7 can be included additionally or alternatively to any of the steps shown in FIGS. 5-6. Some examples may not include all of the steps shown in FIG. 7.

In block 702, the transceiver receives a wireless communication (e.g., from another transceiver). The transceiver can receive the wireless communication via an antenna. The antenna can detect the wireless communication and transmit an associated signal to a processor (e.g., within the transceiver).

In block 704, the transceiver determines a characteristic of the wireless communication. For example, the transceiver can determine an amplitude, phase, and frequency of the wireless communication. In some examples, the characteristic can include a change in an amplitude, phase, and frequency between two or more wireless communications. For example, the transceiver can compare the amplitude, phase, and frequency of the wireless communication with an amplitude, phase, and frequency of a previous wireless communication (e.g., which can be stored in memory).

In block 706, the transceiver determines a property of a wellbore, a fluid (e.g., cement), or a casing string; a proximity to the wellbore surface; a distance between transceivers; or any combination of these. In some examples, the transceiver can determine the property, proximity, and distance, respectively, based on the characteristic. For example, the transceiver can determine the conductivity of the fluid or the wellbore based on the amplitude, frequency, or phase of the wireless communication.

In some examples, the transceiver can determine a distance between the transceivers based on one or more characteristics (e.g., the type, frequency, duration, waveform, and/or amplitude) of the wireless communication. For example, the transceiver can receive a wireless communication from another transceiver and determine the distance to the other transceiver based on the transmission medium between the transceivers and/or the amplitude of the wireless communication. As another example, the transceiver can determine a distance between the transceivers based on a timing of wireless communications between the transceivers. For example, a transceiver may transmit a wireless communication to the other transceiver, which may receive the wireless communication and transmit a response back to the transceiver. The transceiver can determine the total time between the initial wireless communication and the response. Based on the total time, the transceiver can determine a distance between the transceivers. For example, the transceiver can divide the total time by two (because the total time can take into account the roundtrip time of the wireless communication) to determine a one-way time. The transceiver can divide the one-way time by the speed of sound to determine the distance between the transceivers.

In block 708, the transceiver selects a transmission mode from multiple transmission modes. The transceiver can select the transmission mode based on the determined property, proximity, distance, etc. For example, the transceiver can include a lookup table stored in memory in which wellbore properties, fluid properties, casing string properties, and other well system (and transceiver) characteristics are mapped to transmission modes. The transceiver (e.g., a processor within the transceiver) can consult the lookup table and select a transmission mode associated with a particular well system characteristic or set of characteristics.

In block 710, the transceiver transmits a signal indicating the location of the fluid, the presence or absence of the surface wave, or both. The transceiver can transmit the signal using the transmission mode selected in block 708.

In some aspects, systems and methods for downhole fluid detection using surface waves are provided according to one or more of the following examples:

Example #1

A communication system that is positionable in a wellbore can include a first transceiver positioned externally to a casing string. The first transceiver can be operable to detect a presence or an absence of a surface wave, determine a location of a fluid in the wellbore based on the presence or the absence of the surface wave, and transmit data indicative of the location to a second transceiver. The surface wave can include an electromagnetic wave that includes a magnetic field or an electric field that is non-transverse to a direction of propagation of the surface wave. The communication system can also include the second transceiver. The second transceiver can be positioned externally the casing string and operable to receive the data.

Example #2

The communication system of Example #1 may feature the first transceiver being electrically coupled to a sensor for determining a characteristic of the fluid, the casing string, or a cement sheath. The sensor can include a pressure sensor, a temperature sensor, a microphone, a resistivity sensor, a vibration sensor, or a fluid flow sensor.

Example #3

The communication system of any of Examples #1-2 may feature the first transceiver including a processing device and a memory device. The memory device can store instructions executable by the processing device for causing the processing device to: receive a sensor signal from a sensor; determine a property of the wellbore or the fluid based on the sensor signal; select a transmission mode from multiple transmission modes based on the property; and transmit a signal using the transmission mode and indicating the location.

Example #4

The communication system of Example #3 may feature the multiple transmission modes including magnetic induction, acoustic transmissions, vibrations, mud pulse telemetry, surface waves, radio frequency communications, and pulsed optical signals.

Example #5

The communication system of any of Examples #1-4 may feature the first transceiver including a processing device and a memory device. The memory device can store instructions executable by the processing device for causing the processing device to: receive a wireless communication from another transceiver; determine a characteristic of the wireless communication; determine a property of the wellbore or the fluid based on the characteristic; select a transmission mode from multiple transmission modes based on the property; and transmit a signal using the transmission mode and indicating the location.

Example #6

The communication system of any of Examples #1-5 may feature the second transceiver being positioned on a second casing string with an inner diameter that is larger than an outer diameter of the casing string.

Example #7

The communication system of any of Examples #1-6 may feature a third transceiver positioned within a well tool. The second transceiver can be operable to relay the data to the third transceiver. The third transceiver can be operable to relay the data to a surface of the wellbore via a wireline or fiber optic cable.

Example #8

The communication system of any of Examples #1-7 may feature the first transceiver and the second transceiver being positioned for generating and detecting surface waves that propagate along an interface surface between the casing string and a cement sheath.

Example #9

A system can include a first transceiver positioned externally to a casing string for detecting surface waves in a wellbore and communicating data. The surface waves can each comprise a magnetic field or an electric field that is non-transverse to a direction of propagation of the surface waves. The system can also include a second transceiver coupled to the casing string for receiving the data for determining a location of a fluid in the wellbore based on the data.

Example #10

The system of Example #9 may feature the first transceiver being electrically coupled to a sensor for determining a characteristic of the fluid, the casing string, or a cement sheath. The sensor can include a pressure sensor, a temperature sensor, a microphone, a resistivity sensor, a vibration sensor, or a fluid flow sensor.

Example #11

The system of any of Examples #9-10 may feature the first transceiver including a processing device and a memory device. The memory device can store instructions executable by the processing device for causing the processing device to: receive a sensor signal from a sensor; determine a property of the wellbore or the fluid based on the sensor signal; select a transmission mode from multiple transmission modes based on the property; and transmit a signal using the transmission mode and indicating a presence or an absence of the surface waves.

Example #12

The system of Example #11 may feature the multiple transmission modes including magnetic induction, acoustic transmissions, vibrations, mud pulse telemetry, surface waves, radio frequency communications, and pulsed optical signals.

Example #13

The system of any of Examples #9-12 may feature the first transceiver including a processing device and a memory device. The memory device can store instructions executable by the processing device for causing the processing device to: receive a wireless communication from another transceiver; determine a characteristic of the wireless communication; determine a property of the wellbore or the fluid based on the characteristic; select a transmission mode from multiple transmission modes based on the property; and transmit a signal using the transmission mode and indicating a presence or an absence of surface waves.

Example #14

The system of any of Examples #9-13 may feature the first transceiver being positioned on a second casing string with an inner diameter that is larger than an outer diameter of the casing string.

Example #15

The system of any of Examples #9-14 may feature a third transceiver positioned within a well tool. The second transceiver can be operable to relay the data to the third transceiver. The third transceiver can be operable to relay the data to a surface of the wellbore via a wireline or fiber optic cable.

Example #16

The system of any of Examples #9-15 may feature the first transceiver and the second transceiver being positioned for generating and detecting the surface waves that propagate along an interface surface between the casing string and a cement sheath.

Example #17

The system of any of Examples #9-16 may feature the first transceiver including an antenna positioned coaxially around the casing string for detecting the surface waves.

Example #18

A method can include detecting, by a transceiver positioned externally to a casing string, a presence or an absence of a surface wave. The surface wave can include an electromagnetic wave with a magnetic field or an electric field that is non-transverse to a direction of propagation of the surface wave. The method can also include determining, by the transceiver, a location of a fluid in a wellbore based on the presence or the absence of the surface wave. The method can also include transmitting, by the transceiver, data indicative of the location to a second transceiver.

Example #19

The method of Example #18 may feature receiving a sensor signal from a sensor. The method may also feature determining a property of the wellbore or the fluid based on the sensor signal. The method may further feature selecting a transmission mode from multiple transmission modes based on the property. The multiple transmission modes can include magnetic induction, acoustic transmissions, vibrations, mud pulse telemetry, surface waves, radio frequency communications, and pulsed optical signals. The method can also include transmitting a signal using the transmission mode and indicating the presence or the absence of the surface wave.

Example #20

The method of any of Examples #18-19 may feature receiving a wireless communication from another transceiver. The method may also feature determining a characteristic of the wireless communication. The method may further feature determining a property of the wellbore or the fluid based on the characteristic. The method may also feature selecting a transmission mode from multiple transmission modes based on the property. The method may further feature transmitting a signal using the transmission mode and indicating the presence or the absence of the surface wave.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A communication system that is positionable in a wellbore, the communication system comprising:
a first transceiver positioned externally to a casing string and operable to detect a presence or an absence of a surface wave, determine a location of a fluid in the wellbore based on the presence or the absence of the surface wave, and transmit data indicative of the location to a second transceiver, wherein the surface wave comprises an electromagnetic wave that includes a magnetic field or an electric field that is non-transverse to a direction of propagation of the surface wave; and
the second transceiver positioned externally to the casing string and operable to receive the data.

2. The communication system of claim 1, wherein the first transceiver is electrically coupled to a sensor comprising a pressure sensor, a temperature sensor, a microphone, a resistivity sensor, a vibration sensor, or a fluid flow sensor for determining a characteristic of the fluid, the casing string, or a cement sheath.

3. The communication system of claim 2, wherein the first transceiver comprises:
a processing device; and
a memory device in which instructions executable by the processing device are stored for causing the processing device to:
receive a sensor signal from the sensor;
determine a property of the wellbore or the fluid based on the sensor signal;
select a transmission mode from a plurality of transmission modes based on the property; and
transmit a signal using the transmission mode and indicating the location.

4. The communication system of claim 3, wherein the plurality of transmission modes comprise magnetic induction, acoustic transmissions, vibrations, mud pulse telemetry, surface waves, radio frequency communications, and pulsed optical signals.

5. The communication system of claim 1, wherein the first transceiver comprises:
a processing device; and
a memory device in which instructions executable by the processing device are stored for causing the processing device to:
receive a wireless communication from another transceiver;
determine a characteristic of the wireless communication;
determine a property of the wellbore or the fluid based on the characteristic;
select a transmission mode from a plurality of transmission modes based on the property; and
transmit a signal using the transmission mode and indicating the location.

6. The communication system of claim 1, wherein the second transceiver is positioned on a second casing string with an inner diameter that is larger than an outer diameter of the casing string.

7. The communication system of claim 1, further comprising a third transceiver positioned within a well tool, wherein the second transceiver is operable to relay the data to the third transceiver, and the third transceiver is operable to relay the data to a surface of the wellbore via a wireline or fiber optic cable.

8. The communication system of claim 1, wherein the first transceiver and the second transceiver are positioned for generating and detecting surface waves that propagate along an interface surface between the casing string and a cement sheath.

9. A system comprising:
a first transceiver positioned externally to a casing string for detecting surface waves in a wellbore and communicating data, wherein the surface waves each comprise a magnetic field or an electric field that is non-transverse to a direction of propagation of the surface waves; and
a second transceiver coupled to the casing string for receiving the data for determining a location of a fluid in the wellbore based on the data.

10. The system of claim 9, wherein the first transceiver is electrically coupled to a sensor comprising a pressure sensor, a temperature sensor, a microphone, a resistivity sensor, a vibration sensor, or a fluid flow sensor for determining a characteristic of the fluid, the casing string, or a cement sheath.

11. The system of claim 10, wherein the first transceiver comprises:

a processing device; and
a memory device in which instructions executable by the processing device are stored for causing the processing device to:
 receive a sensor signal from the sensor;
 determine a property of the wellbore or the fluid based on the sensor signal;
 select a transmission mode from a plurality of transmission modes based on the property; and
 transmit a signal using the transmission mode and indicating a presence or an absence of the surface waves.

12. The system of claim 11, wherein the plurality of transmission modes comprise magnetic induction, acoustic transmissions, vibrations, mud pulse telemetry, surface waves, radio frequency communications, and pulsed optical signals.

13. The system of claim 9, wherein the first transceiver comprises:
a processing device; and
a memory device in which instructions executable by the processing device are stored for causing the processing device to:
 receive a wireless communication from another transceiver;
 determine a characteristic of the wireless communication;
 determine a property of the wellbore or the fluid based on the characteristic;
 select a transmission mode from a plurality of transmission modes based on the property; and
 transmit a signal using the transmission mode and indicating a presence or an absence of the surface waves.

14. The system of claim 9, wherein the first transceiver is positioned on a second casing string with an inner diameter that is larger than an outer diameter of the casing string.

15. The system of claim 9, further comprising a third transceiver positioned within a well tool, wherein the second transceiver is operable to relay the data to the third transceiver, and the third transceiver is operable to relay the data to a surface of the wellbore via a wireline or fiber optic cable.

16. The system of claim 9, wherein the first transceiver and the second transceiver are positioned for generating and detecting the surface waves that propagate along an interface surface between the casing string and a cement sheath.

17. The system of claim 9, wherein the first transceiver comprises an antenna positioned coaxially around the casing string for detecting the surface waves.

18. A method comprising:
detecting, by a transceiver positioned externally to a casing string, a presence or an absence of a surface wave that comprises an electromagnetic wave with a magnetic field or an electric field that is non-transverse to a direction of propagation of the surface wave;
determining, by the transceiver, a location of a fluid in a wellbore based on the presence or the absence of the surface wave; and
transmitting, by the transceiver, data indicative of the location to a second transceiver.

19. The method of claim 18, further comprising:
receiving a sensor signal from a sensor;
determining a property of the wellbore or the fluid based on the sensor signal;
selecting a transmission mode from a plurality of transmission modes based on the property, wherein the plurality of transmission modes comprise magnetic induction, acoustic transmissions, vibrations, mud pulse telemetry, surface waves, radio frequency communications, and pulsed optical signals; and
transmitting a signal using the transmission mode and indicating the presence or the absence of the surface wave.

20. The method of claim 18, further comprising:
receiving a wireless communication from another transceiver;
determining a characteristic of the wireless communication;
determining a property of the wellbore or the fluid based on the characteristic;
selecting a transmission mode from a plurality of transmission modes based on the property; and
transmitting a signal using the transmission mode and indicating the presence or the absence of the surface wave.

* * * * *